United States Patent [19]

Fiske

[11] Patent Number: 4,974,810
[45] Date of Patent: Dec. 4, 1990

[54] FLARE LIGHT COMPENSATION

[75] Inventor: John M. Fiske, Medford, Mass.

[73] Assignee: Eastman Kodak Company, Rochester, N.Y.

[21] Appl. No.: 452,248

[22] Filed: Dec. 18, 1989

[51] Int. Cl.$^5$ .............................................. G01J 1/32
[52] U.S. Cl. ..................................... 250/216; 358/160
[58] Field of Search ................ 250/206, 214 G, 216, 250/237 R; 358/160, 166

[56] References Cited

U.S. PATENT DOCUMENTS

| | | | |
|---|---|---|---|
| 3,621,132 | 11/1971 | Page | 358/160 |
| 3,641,259 | 2/1972 | Loughlin | 358/160 |
| 4,302,777 | 11/1981 | Kemner et al. | 358/160 |
| 4,341,956 | 7/1982 | Bax | 250/214 C |
| 4,401,887 | 8/1983 | Finley et al. | 250/216 |
| 4,495,422 | 1/1985 | Wiggins | 250/237 R |
| 4,506,152 | 3/1985 | Gupta | 350/625 |
| 4,558,214 | 12/1985 | Fujii et al. | 358/206 |
| 4,680,644 | 7/1987 | Shirato et al. | 358/294 |
| 4,714,830 | 12/1987 | Usui | 250/234 |
| 4,728,791 | 3/1988 | Goto | 250/327.2 |

Primary Examiner—David C. Nelms
Assistant Examiner—Stephone B. Allen

[57] ABSTRACT

A system for compensating for flare light in an optical imaging system comprising a detector for detecting light from an image and producing a signal related to the amount of light detected, a flare light detector for viewing the flare light and producing a signal related to the amount of light viewed, and a compensator for reducing the signal from the image detector in response the signal from the flare light detector.

10 Claims, 5 Drawing Sheets

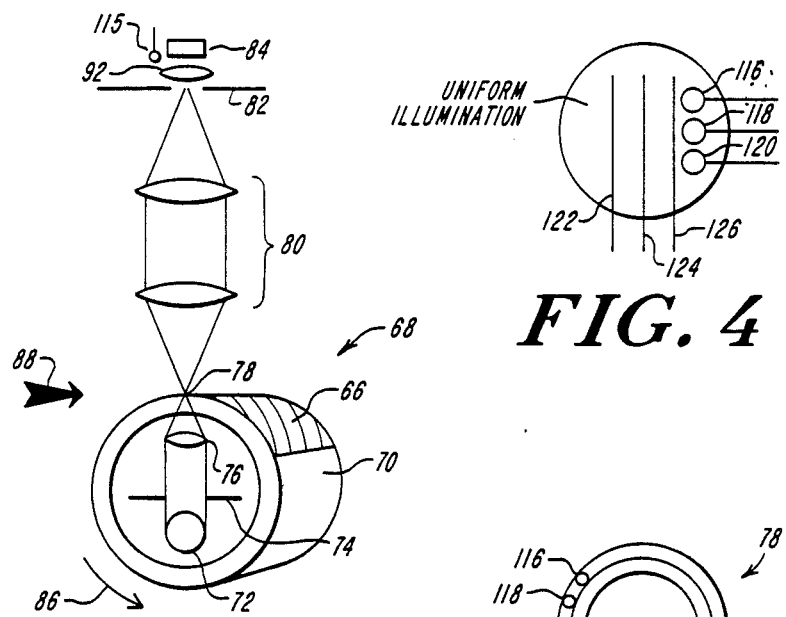
FIG. 4
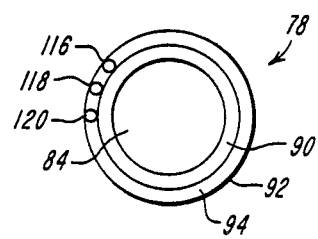
FIG. 5
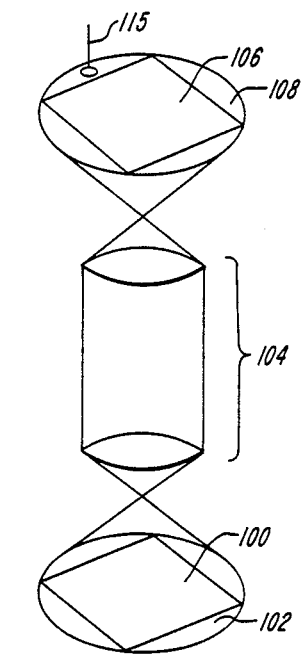
FIG. 5A
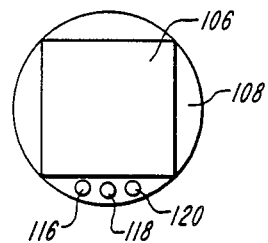
FIG. 6
FIG. 6A

FLARE LIGHT COMPENSATION

BACKGROUND OF THE INVENTION

This invention relates to flare light compensation in optical systems.

Flare light degrades an image formed by optical systems. Flare light is defined as non-image light which is imposed on the image formed by an optical system and is the result of the scattering and reflection of image light by the optical elements in the system. As a result of flare light, the dark portions of the image formed by an optical system appear lighter.

Optical systems are typically constructed from optical elements having anti-reflection coatings. These coatings reduce reflected light and so reduce flare. However, even in these optical systems, 1-3% of the light level found in the white areas of the image is reflected by the components in the optical system as flare light. This percentage is called the flare characteristic of the system.

Uniform flare light is caused by the scattering of light passing through the optical elements such that a fairly uniform light is imposed over all portions of the image. The intensity of uniform flare light is a function of the amount of light in the image. The brighter the image (that is, the more light areas) the greater the flare. The intensity of flare light, as described above, is also a function of how the components of the optical system scatter and reflect light. Finally, the intensity of flare light is a function of the wavelengths of the light present in the image. Taking these effects into account, uniform flare light intensity can then be described mathematically by the expression:

$$I_f = f \int \int \int I(x,y,\lambda) da d\lambda / A$$

where f, a constant, is the flare characteristic related to the amount of white light in the image scattered by the optical elements as previously described, $\lambda$ is the wavelength of the light, da is the area over which the intensity is integrated, $d\lambda$ is the wavelengths over which the intensity is integrated and A is the total area of the image.

One of the effects of uniform flare light is the desaturation of the image color. This happens because the flare light, by its nature, may impose light of other colors upon the image. For example, if the brightest parts of the image are mostly red, the flare light produced will be mostly red and any portions of the image which are not red, for example green, will be degraded (desaturated) by the superposition of the red flare light on the green portion of the image.

Another result of flare light is that the dynamic range of a detector in a system is effectively decreased. To understand this decrease, consider a simple optical system composed of an object to be imaged, a lens, and a detector. When the detector is in absolute darkness, it produces a noise signal, called the dark current. Assume for the purpose of this example that the dark current signal is of magnitude 0.01 units. Assume further that when the detector views an object that is white and in strong light, such that it produces the largest signal of which it is capable, it produces a signal of magnitude 100 units. The dynamic range of the detector is then $10^4$ (that is, the detector is responsive to light in the range from 0.01 to 100 units). When the detector views a object that is absolutely black, ideally the signal should be equal to the dark current value. However, due to flare light caused by the scattering of light from areas adjacent to the black object, the black image formed is not absolutely black but is somewhat lighter. Assume that when this black image is viewed, the detector now generates a signal equal to 1 unit instead of the 0.01 units it would have generated had there not been flare light. The result is that the dynamic range of the detector has been decreased from $10^4$ to $10^2$ (that is, the detector is now responsive to light in the range from 1 unit to 100 units). Therefore, to utilize the greatest dynamic range to which the detector is capable of responding, it is necessary to cancel the effects of flare.

Previous methods of compensating for flare light have utilized the fact that the flare is dependent upon how the optical elements scatter light to compensate for flare light. These methods measured the amount of light scattered by the optical elements when there was no object imaged (i.e. an illuminated background) and compensated all subsequent images using this pre-measured flare value. However, since flare light is also function of the amount of light forming the image, the use of the same pre-measured value for all images resulted in some images being over-compensated and some being under-compensated, depending upon the how much light was present in the image being compensated.

The present invention compensates an image based upon how much uniform flare light is actually present and therefore reduces the tendency to under compensate or over compensate a given image.

SUMMARY OF THE INVENTION

The invention provides a new and improved system for compensating for flare light in an optical imaging system.

In brief summary, the new system comprises a detector for detecting light from an image and producing a signal related to the amount of light detected, a flare light detector for viewing the flare light and producing a signal related to the amount of flare light viewed, and a compensator for generating a compensated image signal in response the signal from the flare light detector.

One aspect of the invention is the compensation of the image signal by the subtraction of the analog flare signal from the analog image signal using difference amplifiers.

Another aspect of the invention is the compensation of the image signal by the subtraction of the digitized signal from the flare detectors from the digitized signal from the image detectors by a digital processor.

Yet another aspect of the invention is a method of producing a flare compensated image signal by detecting light from an image and producing a signal related to the amount of light detected, viewing flare light and producing a signal related to the amount of light viewed and generating a flare compensated signal in response to the signal from the flare light.

Still yet another aspect of the invention is a method of producing a flare compensated image signal by determining a transfer function which indicates how much of the image light is converted into flare light by the optical system, measuring the amount of light in an image, calculating the amount of flare light present using the transfer function and the amount of light in the image, and compensating the image by the calculated amount of flare light.

BRIEF DESCRIPTION OF THE DRAWING

This invention is pointed out with particularity in the appended claims. The above and further advantages of this invention may be better understood by referring to the following description taken in conjunction with the accompanying drawings, in which:

FIG. 4 is a depiction of one embodiment of a method of calibrating the embodiment of the invention shown in FIG. 1;

FIG. 5 is a schematic diagram of an embodiment of the invention used in a drum scanner, FIG. 5A is a schematic diagram of the flare light pattern and placement of the flare detectors in the embodiment shown in FIG. 5;

FIG. 6 is a schematic diagram of an embodiment of the invention in a two dimensional array imaging system, FIG. 6A is a schematic diagram of the flare light pattern and placement of the flare detectors for the embodiment shown in FIG. 6.

PREFERRED EMBODIMENT

Figure 1:
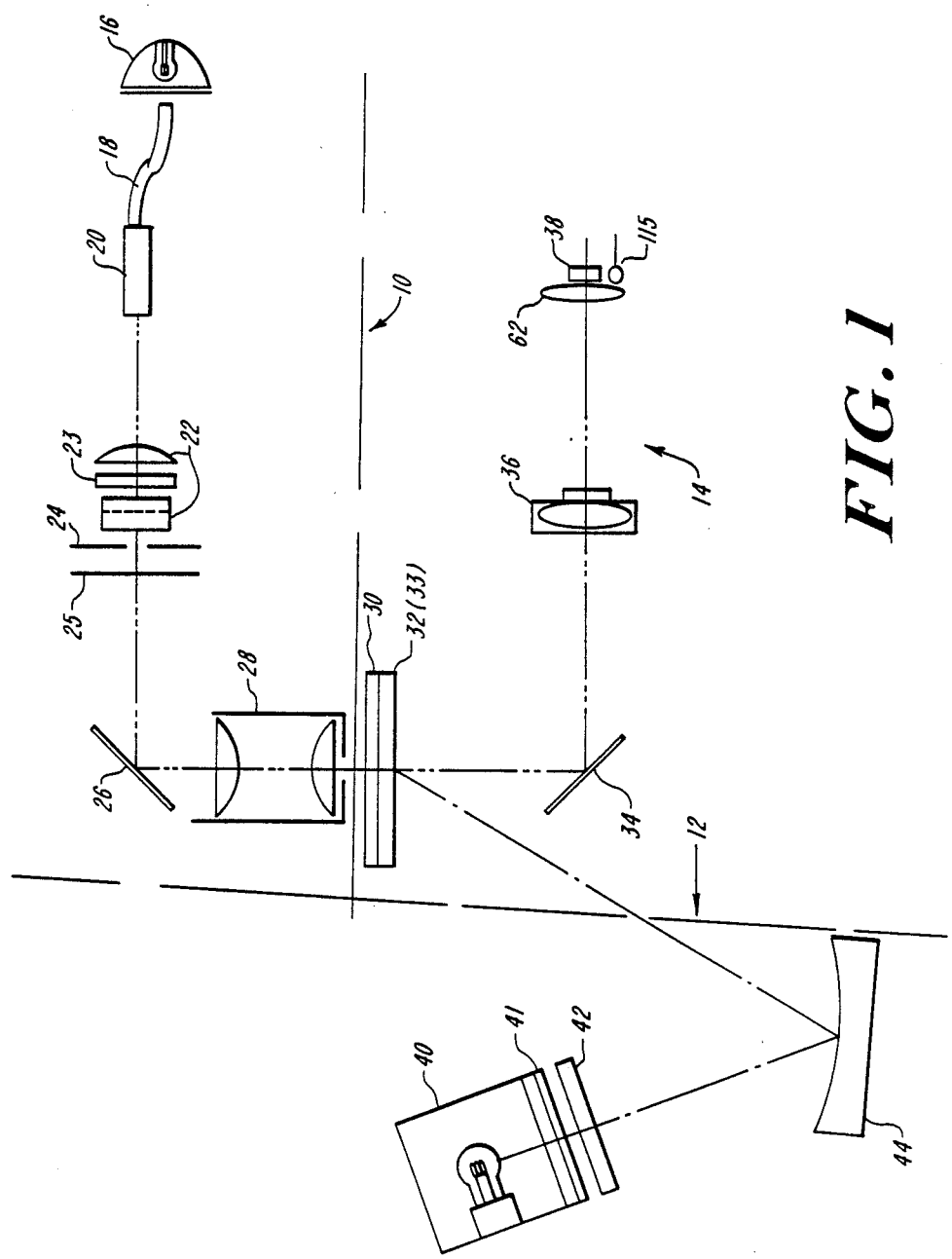
FIG. 1 is a schematic diagram of an embodiment of the invention used in a line scanner.

Referring to FIG. 1, (which shows an embodiment of the invention used with the incident light in both a transmission mode and a reflection mode), a typical line scanning system comprises a image collection portion 14 and either a transmitted incident light portion 10 or a reflected incident light portion 12 or both. Note that when a scanner has both reflected incident light and transmitted incident light portions, both portions are not used simultaneously. In the case where transmitted incident light is used (portion 10), light from a lamp 16, is shaped by a fiber optic bundle 18 and a beam spreader 20 into a line. The line of light is focussed by a cylindrical lens system 22 through an infra-red (IR) filter 23 to remove the heat from the light, an aperture 24 to collimate the light, and a color filter 25 onto a condensing mirror 26. The condensing mirror 26 reflects the light to a condensing lens system 28 and a field stop 30 onto a transmission film 32 to be scanned. The light which passes through the film 32 forms an image which is reflected by an objective mirror 34 through an objective lens system 36 and is focussed on the detector array 38. The combination of optical elements such as lenses and mirrors in the image collecting portion 14 and the transmitted incident light portion 10 define the optical path for the transmitted incident light system.

Similarly, in a reflected incident light system (portion 12), light from a lamp 40 passes through an infra-red filter 41 and a color filter 42 and is reflected by a toroid mirror 44 prior to impinging on a reflection film 33 to be scanned. Once the light is reflected from the film 33 to form an image, the image light follows the same path as in the transmission incident light system to reach the detector array 38. The combination of optical elements such as lenses and mirrors in the image collecting portion 14 and the reflected incident light portion 12 define the optical path for the reflected incident light system.

It should also be noted that although the reflection film 33 and the transmission film 32 are shown to occupy the same location in the scanner, only one film would be in place at any time. Specifically, the reflection film is used with the reflected incident light portion and the transmission film is used with the transmission incident light portion.

Figure 2:
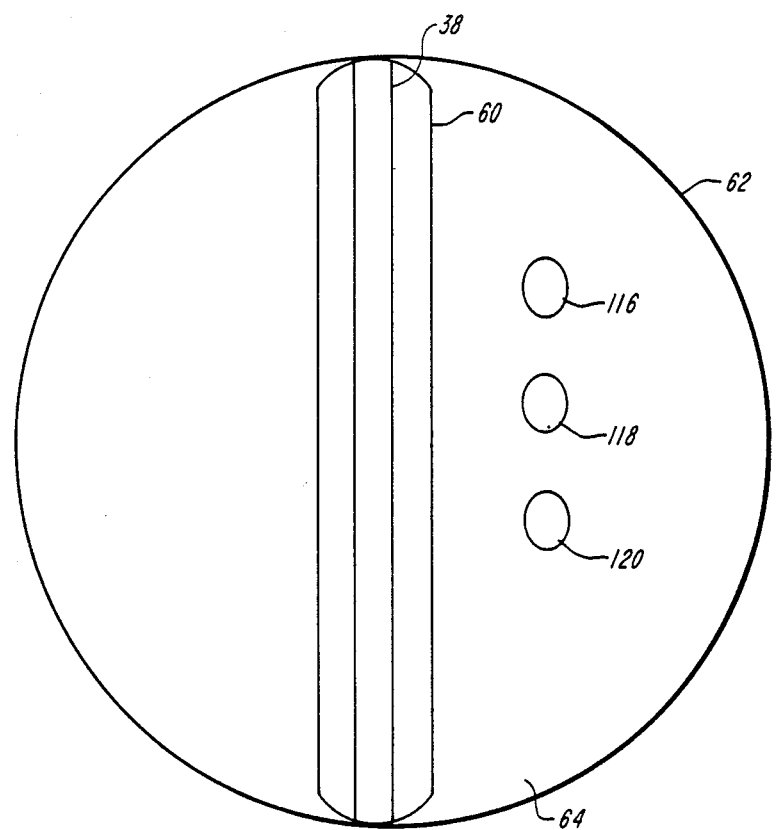
FIG. 2 is a schematic diagram of the flare light and placement of the flare detectors in the embodiment shown in FIG. 1.

In accordance with the invention, a flare light detector set 115 is provided which is positioned proximate detector 38 but displaced therefrom sufficiently to view only flare light. Referring also to FIG. 2, the field of view 62, which is the region in the plane of the image with an unobstructed view of the plane of the object through the optical path of the line scanner of FIG. 1 (shown in FIG. 1 as an ellipsoid encompassing the detector array 38 and the flare detectors 115), contains an illuminated image region 60 generally centered about a detector array 38 and a flare region 64 which is located within the field of view 62 but outside the region of the image 60.

Typically, a linear array detector 38 comprises three individual linear arrays of charge-coupled devices (CCDs). These arrays may comprise 1000 or more photosensitive elements. Each CCD device contains a photodiode array and a shift buffer built in. Signals corresponding to the amount of light detected by the photodiode are transferred into the buffer. The signal values are then read serially from the buffer when the detector is accessed. In a linear detector having three linear arrays, each array is covered by a separate primary color transmission filter so that only light of the primary color reaches that array and therefore each array will respond to only one of the primary colors.

Generally, the illuminated area of the film 32 is reduced by the field stop 30 such that the image formed at the detector has an area only slightly greater than the detector area. However, since in general it is desired that all the detectors in the detector array receive some light, the image area is not less than the detector area. In this way, the amount of non-image light is reduced from the amount which would have occurred had there been no stop, and so flare is reduced. The flare detectors 116, 118, and 120 (115 in FIG. 1) are positioned to detect light only within the flare region 64.

The invention compensates for flare light by subtracting the signal from the detector viewing only flare light from the signal from the detector viewing the image. One embodiment of the invention, shown in FIG. 3, performs the subtraction on the analog signals as they come from the from the detectors. For example in a line scanning system, a detector unit 114 (which corresponds to detector unit 38 in FIG. 1) comprises a set of linear detector arrays, one of the arrays 122 detects only red light, one of the arrays 124 detects only blue light and one of the arrays 126 detects only green light. The signals generated by each array in response to light are shifted into a buffer (not shown) and read sequentially under the control of the computer 146. Three individual detectors 116, 118, and 120 are positioned to detect only flare light. Red flare light detector 116 responds only to red light, blue flare light detector 118 responds only to blue light, and green flare light detector 120 responds only to green light. Each detector 116, 118 and 120 has an associated response compensation circuit 128, 130, and 132 for calibration setting, about which more will be said shortly.

The signal (RD FL CMP, BL FL CMP, and GR FL CMP) from each flare detector 116, 118, and 120 is subtracted from the signal (RD, IM, BL, IM, and GR IM) from its respective linear array 122, 124, 126 by a difference amplifier 134, 136, 138, respectively, to generate a signal comprising the flare compensated red, blue and green component, respectively, of the image (RD CMP, BL CMP, and GR CMP). The compensated output signals from the difference amplifiers are passed through a compander to generate electrical signals with characteristics more nearly corresponding to visual response. That is, the linear response of the photodetector is converted to compress the response at high intensities and expand the response at low intensities, typically by using a logarithmic amplifier. Each of the output signals is converted to digital values by an analog-to-digital (A/D) converter 142 for processing by a digital processor 146. The digital processor contains a lookup table (LUT) 144 for translating the compound digital signals back into a more linear form for subsequent manipulation of the data.

Figure 3:
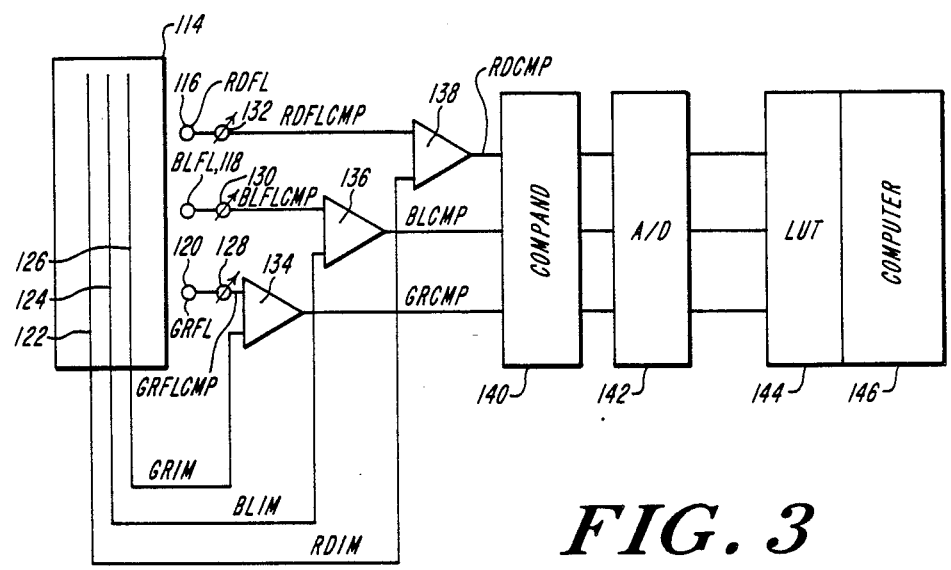
FIG. 3 is a schematic diagram of an embodiment of the invention for analog compensation with a linear detector array.
Figure 3A:
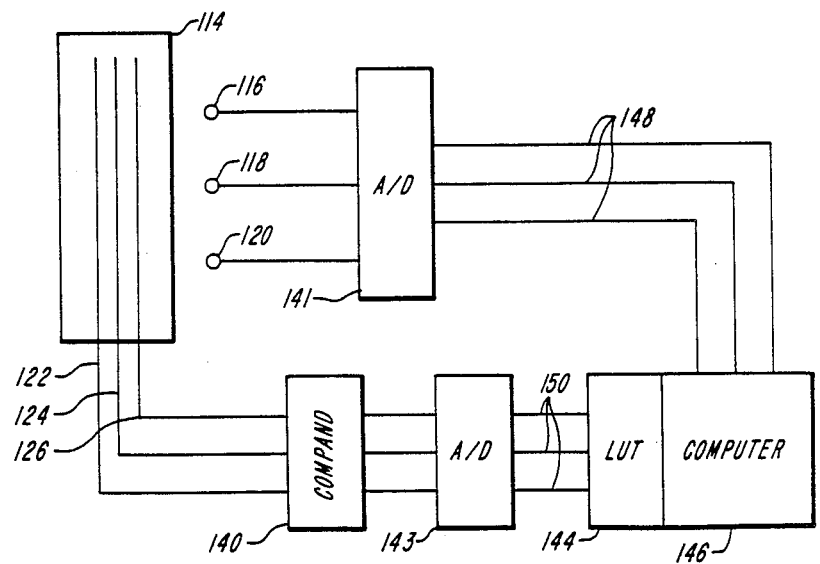
FIG. 3A is an embodiment of the invention for digital compensation with a linear detector array.

In a second embodiment, depicted in FIG. 3A, the system performs the subtraction on digitized signals. In this embodiment two sets of A/D converters are used. One set of A/D converters 141 converts the flare signals from the red, blue and green flare detectors 116, 118, 120 to produce digitized output signals 148. A second set of A/D converters 143 digitize the signals from the compander 140, which transforms the analog signals from the detectors 122, 124, and 126 logarithmically. The digitized signals 150 are converted by a lookup table (LUT) 144 into appropriate linear red-green-blue values. The digitized values 148 of the signals from the flare detectors 116, 118 and 120 are subtracted by a computer 146 from the corresponding digitized signal values from the image detectors 122, 124, 126 in a digital processor 146.

The gain of each flare detector must be adjusted to match the signal levels produced by the imaging elements. That is, when the flare detector and the imaging element are both detecting only flare light, their output signals should be equal. Since, in general the flare light detector is larger than the image detector, the signal from the flare detector must be attenuated. Typically this will require the attenuating of the signal proportionally to the difference in the detector areas.

One technique for performing this attenuation or is shown in FIG. 4. Both the red-green-blue detectors 122, 124, 126 and the flare detectors 116, 118, 120 are uniformly illuminated and the gain of each of the flare detectors is adjusted to provide a signal equal to the signals produced by the imaging elements. This is a first order correction which does not remove gain variations or dark current variations among the array elements.

Therefore, in the embodiment shown in FIG. 3, the signals from the individual detectors 116, 118, and 120 are varied by adjusting their respective compensation circuits 132, 130, and 128 so as to produce a signal equal to the signals generated by the individual image detector arrays 122, 124, 126. Similarly, in the digital embodiment shown in FIG. 3A, the computer 146 adjusts the values of the individual flare detector signals collectively labeled 148 to equal the image signals generated by detectors 122, 124 and 126.

The invention may also be embodied in scanners other than line scanners as described above in connection with FIGS. 1-4. As examples, FIGS. 5 and 5A depict a spot scanner, such as a drum scanner, and FIGS. 6 and 6A depict a scanner with a two-dimensional detector 106, both of which are constructed in accordance with the invention.

Referring to FIG. 5, in a drum scanner 68, the film 6 to be scanned is mounted on the surface of a transparent drum 70. Within the drum 70 is a lamp 72 with an aperture 74 and a condensing lens 76 which projects a spot 78 on the drum 70 surface. Light which passes through the film 66 is collected by a lens system 80 and masked by an aperture 82 and focussed on a detector 84. Because the field stop is set so that the image formed at the detector has an area slightly greater than the detector, even in spot scanners there is some flare (FIG. 5A). As the drum rotates (arrow 86) different portions of the film 66 are brought between the spot of light 78 and the detector 84. As each revolution of the drum 70 completes, the lamp 72 and the rest of the optical train 80 are translated (arrow 88) incrementally down the axis of the drum 70 so as to bring eventually all portions of the film 66 between the spot 78 and the detector 84. Again, in this embodiment the flare detectors 115 are located approximately adjacent to the detector 84. Referring also to FIG. 5A, in a system with a properly set field stop 82 (FIG. 5), the image illuminated area 90 only slightly exceeds the size of the detector 84 and is centered around the detector 84, resulting in a field of view 92 having only a small annular flare area 94 concentric with the image 90. The placement of the three flare detectors 116, 118, and 120 (115 in FIG. 5), in this annular flare area 94, approximately adjacent to the detector 84, guarantees that they only detect flare light 94.

Referring to FIG. 6, a two-dimensional detector array optical system comprises a two-dimensional detector array 106 onto which an optical path 104 focusses an image of an object 100. Again, since all the detectors of the array 106 should receive some light, the illuminated area 102 exceeds the area of the object 100 to be imaged. This results in a flare area 108 surrounding the image 106. The flare detectors 115 are located approximately adjacent the detector 106. In FIG. 6A, it will be seen that in a system with properly set field stops, the flare light area 108 will exceed only slightly the area of the image 106. The placement of the flare detectors 116, 118, and 120 (115 in FIG. 6) in a system with a 2-dimensional array is such that they detect only flare light. Note that because only uniform flare light is being compensated, it is unnecessary to provide more than one set of flare detectors.

Figure 7:
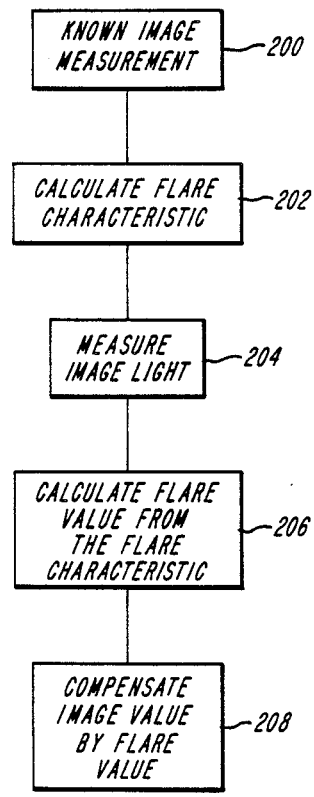
FIG. 7 is a flow diagram indicating the steps in a processes for using the amount image light to calculate the amount of flare light and then compensate the image.
Figure 7A:
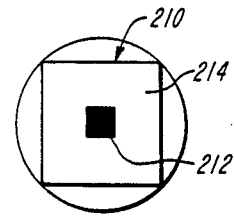
FIG. 7A is an embodiment of an image useful in performing the compensation method of FIG. 7.

Another method for compensating for flare which does not make use of the flare detectors (116, 118, 120), will be described in connection with FIGS. 7 and 7A. The technique begins by illuminating a known image 210 comprising a white background 214 with a relatively small black region 212. This image is viewed through the optical path of the system (step 200). The total red signal, the sum of the signals from all the red elements of the detector array is compared to the average of the red signals generated by the elements viewing the black area 212. The red signal in the black region 212 is due to flare and is proportional to the total red signal. The proportionality is the flare characteristic $f_{red}$. This step is repeated for the blue and green elements to generate the flare characteristics $f_{blue}$, $f_{green}$ for these colors (step 202). The image to be compensated is then viewed (step 204). The red flare component is then calculated by multiplying the red signal from all the red detectors viewing the image by the flare characteristic $f_{red}$ (step 206). This calculated value is then subtracted from the signal from each red element of the detector (step 208). This procedure is then repeated for each color. The flare correction is therefore dependent upon the color components of the light in the image. This method is particularly useful with a two-dimensional detector array, since the entire image is captured at once and since the amount of light falling outside the array is slight.

Having shown the preferred embodiments, those skilled in the art will realize many variations are possible which will still be within the scope and spirit of the claimed invention. Therefore, it is the intention to limit the invention as indicated by the scope of the claims.

What is claimed is:

1. An apparatus for flare light compensation in an optical image detection system comprising:
    an image detector for detecting light from an image and producing a image signal related to the amount of light detected;
    a flare light detector for viewing flare light and producing a flare light signal related to the amount of light viewed; and
    a compensator for generating a flare compensated image signal in response the flare light signal.

2. The apparatus of claim 1 wherein said detector comprises a set of linear light detection arrays.

3. The apparatus of claim 2 wherein one linear light detection array from said set of linear light detection arrays is responsive to one color of light.

4. The apparatus of claim 3 wherein said flare light detector comprises a set of light detectors.

5. The apparatus of claim 4 wherein said flare light detector is intermediate to the ends of the array.

6. The apparatus of claim 4 wherein one light detector from said set of light detectors is responsive to one color of light.

7. The apparatus of claim 1 wherein said compensator means comprises a set of difference amplifiers.

8. The apparatus of claim 1 wherein the compensator comprises:
    an analog to digital converter for converting the signal from the flare light detector to a digitized value;
    an analog to digital converter for converting the signal from the detector array to a digitized value; and
    a processor to subtract the digitized value of the signal from the flare light detector from the digitized value of the signal from the detector array to produce a flare compensated image signal.

9. A method of producing a flare compensated image signal comprising the steps of:
    detecting light from an image and producing a signal related to the amount of light detected;
    viewing flare light and producing a signal related to the amount of light viewed; and
    generating a flare compensated signal in response to the signal from the flare light.

10. A method for producing a flare compensated image signal in an optical system comprising the steps of:
    determining a flare characteristic of the system;
    measuring the total amount of light and color distribution of an image to be compensated;
    multiplying the flare characteristic of the system by the amount of light the image to be compensated to determine the flare light for the image; and
    compensating the value of the intensity of light in the image by the flare component.

* * * * *